United States Patent
Gill

(10) Patent No.: US 12,463,407 B2
(45) Date of Patent: Nov. 4, 2025

(54) MARINE POWER CONDUIT INTERFACE ASSEMBLY

(71) Applicant: Balmoral Comtec Limited, Aberdeen (GB)

(72) Inventor: Aneel Gill, Aberdeen (GB)

(73) Assignee: Balmoral Comtec Limited, Aberdeen (GB)

( * ) Notice: Subject to any disclaimer, the term of this patent is extended or adjusted under 35 U.S.C. 154(b) by 251 days.

(21) Appl. No.: 18/256,764

(22) PCT Filed: Dec. 14, 2021

(86) PCT No.: PCT/GB2021/053289
§ 371 (c)(1),
(2) Date: Jun. 9, 2023

(87) PCT Pub. No.: WO2022/129891
PCT Pub. Date: Jun. 23, 2022

(65) Prior Publication Data
US 2024/0022054 A1   Jan. 18, 2024

(30) Foreign Application Priority Data

Dec. 16, 2020 (GB) ..................... 2019850

(51) Int. Cl.
*H02G 9/02* (2006.01)
*H02G 3/04* (2006.01)

(52) U.S. Cl.
CPC ............. *H02G 3/0462* (2013.01); *H02G 9/02* (2013.01)

(58) Field of Classification Search
CPC .......... H02G 1/08; H02G 1/10; H02G 3/0462; H02G 3/0406; H02G 9/02; H02G 9/12; E02B 2017/0095; F16L 5/00
USPC ........................................ 174/68.3
See application file for complete search history.

(56) References Cited

U.S. PATENT DOCUMENTS

| 2011/0226527 | A1 | 9/2011 | Ritchie-Bland |
| 2018/0363386 | A1* | 12/2018 | Metzlaff ............... E21B 17/021 |
| 2019/0280468 | A1 | 9/2019 | Andreasen |
| 2020/0271263 | A1 | 8/2020 | Hughes et al. |
| 2020/0366074 | A1 | 11/2020 | Little et al. |

FOREIGN PATENT DOCUMENTS

| EP | 3 502 533 | 6/2019 |
| GB | 2513387 | 10/2014 |

OTHER PUBLICATIONS

GB Application No. 2019850.3, Search Report mailed Feb. 3, 2021.
(Continued)

*Primary Examiner* — Timothy J Thompson
*Assistant Examiner* — Michael F McAllister
(74) *Attorney, Agent, or Firm* — Alston & Bird LLP

(57) ABSTRACT

A marine power conduit interface assembly has a slide slidable within a housing. Sliding of the slide in the housing locks the assembly in a socket of an energy generator. The slide has a leg extending axially within a groove formed in the inner surface of the bore of the housing, connected to a ring with a flange which extends radially outwards from an outer surface of the housing. The ring is connected to the leg by a radially inwardly extending finger passing through a slot in the housing. The lock can be activated and deactivated by sliding of the slide in the housing.

16 Claims, 8 Drawing Sheets

(56) References Cited

OTHER PUBLICATIONS

GB Application No. 2118093.0, Search Report mailed May 18, 2022.
WIPO Application No. PCT/GB2021/053289, PCT International Search Report and Written Opinion of the International Searching Authority mailed Feb. 24, 2022.

* cited by examiner

SECTION B-B

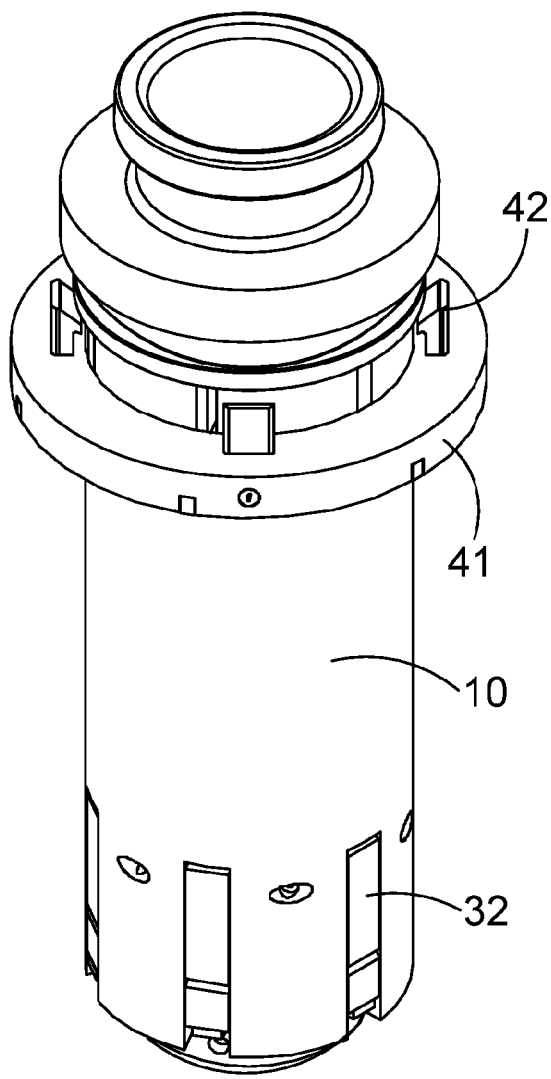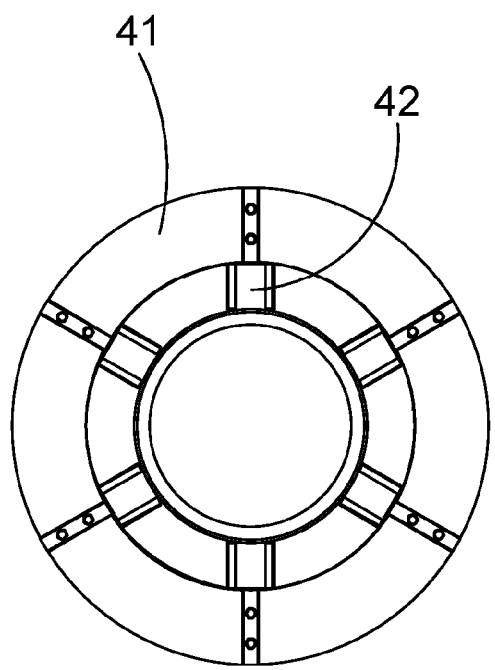
FIG. 5
FIG. 6

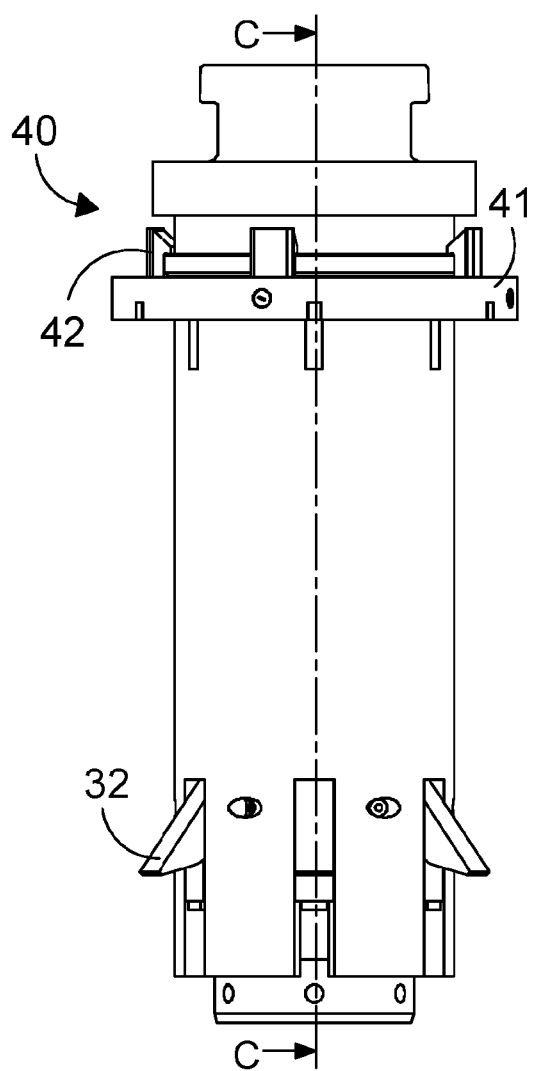
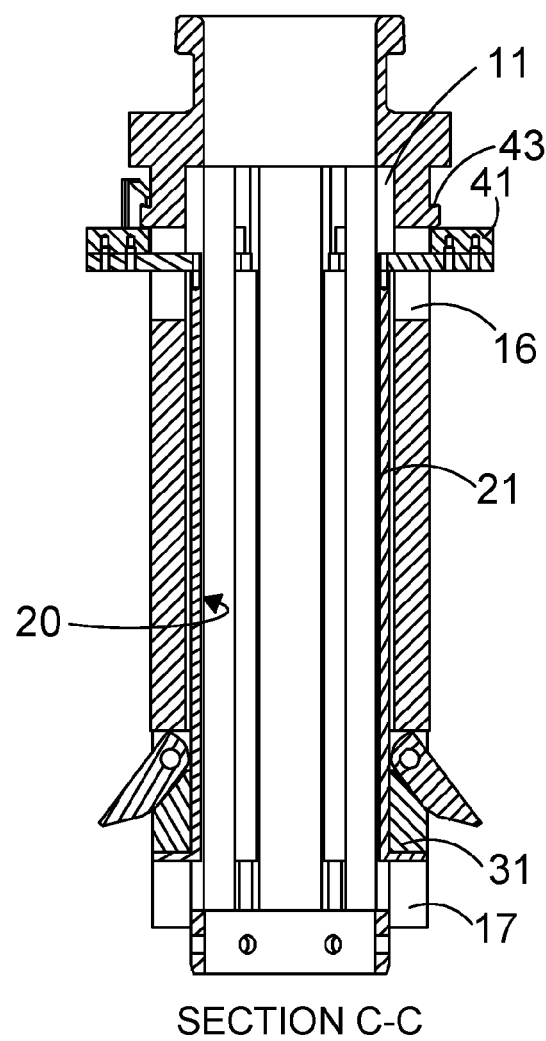
FIG. 7　　　　　FIG. 8
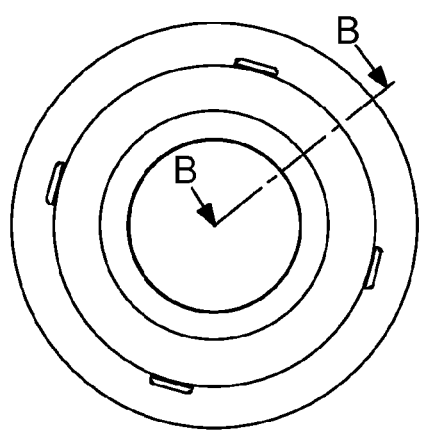
FIG. 9

MARINE POWER CONDUIT INTERFACE ASSEMBLY

CROSS-REFERENCE TO RELATED APPLICATIONS

This application is a national stage application filed under 35 U.S.C. § 371 of International Application No. PCT/GB2021/053289 filed Dec. 14, 2021, which application claims priority to GB2019850.3 filed Dec. 16, 2020, each of which is hereby incorporated by reference herein in its entirety.

The present invention relates to a marine power conduit interface assembly for anchoring a power conduit to a marine energy generator such as a wind turbine, e.g. for connecting a power conduit to an offshore turbine device, typically a wind turbine.

In the construction of offshore wind farms, wind turbines are typically mounted on a base on the seabed. The base can comprise a static leg or pillar fixed to the seabed. Electrical power generated by the wind turbine is taken off the turbine through a power conduit such as a cable, usually fed into a socket passing through the base, e.g. through a side wall of a leg. To reduce wear on the cable, the interface between the cable and the base can have an interface assembly which latches into an aperture on the base and which has a bore which receives the cable. The cable runs through the bore in the interface. Typical systems are described in US2019/0280468 and US 2011/0226527, which are useful for understanding the invention.

SUMMARY

According to the present invention comprises a marine power conduit interface assembly comprising a housing having an axis and a bore to receive a marine power conduit; at least one slide adapted to slide in an axial direction relative to the housing; a locking device adapted to secure the assembly within a socket of a marine energy generator, the locking device having at least one locking arm movable from a first radially retracted position to a second radially expanded position relative to the axis, and a lock operator adapted to move the locking arm from the first to the second position, wherein the lock operator and the locking arm engage by relative sliding movement along the axis to move the locking arm between the first and second radial positions;
wherein the locking arm is disposed on one of the housing and the slide and the lock operator is mounted on the other of the housing and the slide, and wherein relative sliding movement of the housing and slide in an axial direction moves the tapered faces of the lock operator and the locking arm relative to one another to move the locking arm between the first and second radial positions;
wherein the assembly comprises a latch having a release position in which the slide is axially movable relative to the housing and, and a latched position in which relative sliding of the housing and the slide is restricted by the latch;
wherein the slide comprises at least one leg extending axially within the bore of the housing and an annular section in the form of a ring;
wherein the at least one leg is disposed in a groove formed in the inner surface of the bore of the housing;
wherein the ring comprises a flange which extends radially outwards from an outer surface of the housing; and
wherein the ring is connected to the at least one leg by a radially inwardly extending finger passing through a slot in the housing.

Optionally the housing is cylindrical.

Optionally one of the locking arm and the lock operator has a tapered face which engages a face of the other. Optionally both have tapered faces, which mutually engage to move the locking arm between the first and second positions. Optionally the lock operator is on the slide and the locking arm is on the housing.

Optionally the latch comprises a latch member on one of the housing and the slide (optionally the slide) and a latch plate on the other (optionally the housing). Optionally the latch member comprises a hook, and the latch plate optionally comprises a lip over which the hook engages. The latch member is optionally movable, e.g. pivotally relative to the housing, to engage and disengage with the plate. Optionally a portion of the latch member can be partially resilient and able to deform over the plate (e.g. the lip).

Optionally the locking device can be activated by moving the latch between the release and latched positions, e.g. from the release position to the latched position and/or optionally from the latched to the release position. Optionally in the latched position the latch member is engaged with the latch plate. Optionally in the release position the latch member is disengaged with the latch plate. Optionally the latch is moveable between the release position and the latched position in response to relative axial movement between the slide and the housing.

The annular section can optionally comprise a sleeve, or partial sleeve. Optionally the radius of the annular section is larger than the radius of the socket. Optionally the grooves are open to the inner surface of the bore, and optionally have a radial depth of less than the wall thickness of the housing, so that the grooves are typically closed to the outer surface of the housing. Optionally, the radial depth of the grooves is at least equal to the radial dimensions of the legs. In other words, the legs do not protrude from the open faces of the grooves in a radial direction and optionally the grooves have a larger radial depth than the radial dimensions of the legs.

Optionally the grooves have a rectilinear cross section, and can be generally U-shaped, conveniently with straight side walls, and optionally with a flat base opposite the open side of the groove facing the bore. Optionally the legs and the grooves have the same cross-section. Conveniently, the groove and the legs extend parallel to the axis.

Optionally the legs are circumferentially spaced around the axis. Optionally the legs support the lock operator at cantilever ends spaced from the annular section. Optionally the legs are fixed to the annular section at the opposite end to the lock operator. Optionally each leg has an end stop supporting the lock operator, optionally at an inner end of the leg. Optionally the end stop is L-shaped. Optionally the end stops extend radially outwards from the leg. Optionally the end stop abuts against the lock operator.

Optionally the legs and the annular section move as a single unit in an axial direction. Optionally the fingers are fixed (e.g. bolted) to the legs (optionally an outer end of the leg) and the annular section. Each leg typically has a respective groove, finger and slot, all of which are conveniently circumferentially aligned and conveniently are regularly spaced around the circumference of the housing. Optionally the fingers extend radially inwards from the annular ring and optionally to the inner surface of the housing. Optionally the fingers are circumferentially spaced around the axis and pass through slots that are optionally circumferentially spaced around the axis. The fingers pass through slots that optionally extend in an axial direction wherein the axial length of the slots optionally limits the axial movement of the slide.

Optionally the slide has the lock operator mounted on one end, and one of the latch member and the plate (optionally the latch member) on the other end, spaced apart from the lock operator (and optionally mounted on the annular section). Optionally the latch members (e.g. the hooks) are mounted on the annular section.

Optionally the assembly has an inner end, adapted to pass through the socket in the marine energy generator, and an outer end, which in use remains external to the socket. The assembly optionally comprises a stop member between the inner and outer ends, limiting passage of the housing into the socket. Optionally the stop member is connected to the slide, and extends radially from the housing. Optionally the stop member comprises the annular section of the slide, e.g. the flange.

Optionally the housing is connected to a pull-in line which is fed into the socket, and permits the housing to be pulled into the socket during installation. Optionally insertion of the assembly into the socket (e.g. with the inner end inserted first) activates the locking device when the outer surface of the socket engages a radially extending shoulder on the locking device (e.g. the annular section or flange) which extends radially outward from the housing for a greater radial distance than the mouth of the socket. The outer surface of the socket thereby resists further inward movement of the slide into the socket (because the flange or other component is abutting the outer surface of the socket) and further pulling of the housing into the socket then slides the housing inwards into the socket while the slide retains its position relative to the socket, causing sliding movement of the slide relative to the housing.

Optionally the locking device can be deactivated by moving the latch from the latched to the release position. Optionally the latch is moveable from the latched position to the release position in response to relative axial movement between the slide and the housing. Optionally deactivation of the locking device can be performed by applying an axial force on the slide, optionally on the annular ring. Optionally deactivation of the locking device can be performed from outside the socket, for example during decommissioning, but disrupting the connection between the latch member and the plate, e.g. by unhooking the latch member from the plate. This permits relative sliding movement of the slide relative to the housing, which disengages the lock operators from the locking arms, allowing the assembly to slide out of the socket. Optionally the locking device can be disrupted by shearing pins holding the hooks, or cutting the hooks etc.

Optionally in the second radially expanded position, the locking arm is disposed at an angle of less than 90° (optionally less 70°, e.g.)60°relative to the housing. Optionally a free end of the locking arm is disposed in an axial position between a pivot point of the locking arm and an inner end of the assembly adapted to be inserted into the socket. In other words, the free end points towards the inner end of the assembly. Optionally withdrawal of the assembly from the socket collapses the locking arm passively during withdrawal, as the inner walls of the socket bear on the radially extending arms, and move them to the first radially retracted position, which is typically parallel to the axis.

According to the present invention comprises a marine power conduit interface assembly comprising a housing having an axis and a bore to receive a marine power conduit; at least one slide adapted to slide in an axial direction relative to the housing; a locking device adapted to secure the assembly within a socket of a marine energy generator, the locking device having at least one locking arm movable from a first radially retracted position to a second radially expanded position relative to the axis, and a lock operator adapted to move the locking arm from the first to the second position, wherein the lock operator and the locking arm engage by relative sliding movement along the axis to move the locking arm between the first and second radial positions;

wherein the locking arm is disposed on one of the housing and the slide and the lock operator is mounted on the other of the housing and the slide, and wherein relative sliding movement of the housing and slide in an axial direction moves the tapered faces of the lock operator and the locking arm relative to one another to move the locking arm between the first and second radial positions;

wherein the assembly comprises a latch having a release position in which the slide is axially movable relative to the housing and, and a latched position in which relative sliding of the housing and the slide is restricted by the latch.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying figures. Still other aspects, features, and advantages of the present invention are readily apparent from the entire description thereof, including the figures, which illustrates a number of exemplary aspects and implementations. The invention is also capable of other and different examples and aspects, and its several details can be modified in various respects, all without departing from the spirit and scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee.

BRIEF DESCRIPTION OF THE DRAWINGS

In the accompanying drawings:
FIG. 5 shows a perspective view of the FIG. 1 arrangement;
FIG. 6 shows a plan view of the same (corresponds to the FIG. 7 arrangement plan view);
FIG. 7 shows a front view of an interface assembly in a latched position;
FIG. 8 shows a section through line C-C of FIG. 7;
FIG. 9 shows a base view of the FIG. 7 arrangement (corresponds to the FIG. 1 arrangement)

Figure 1:
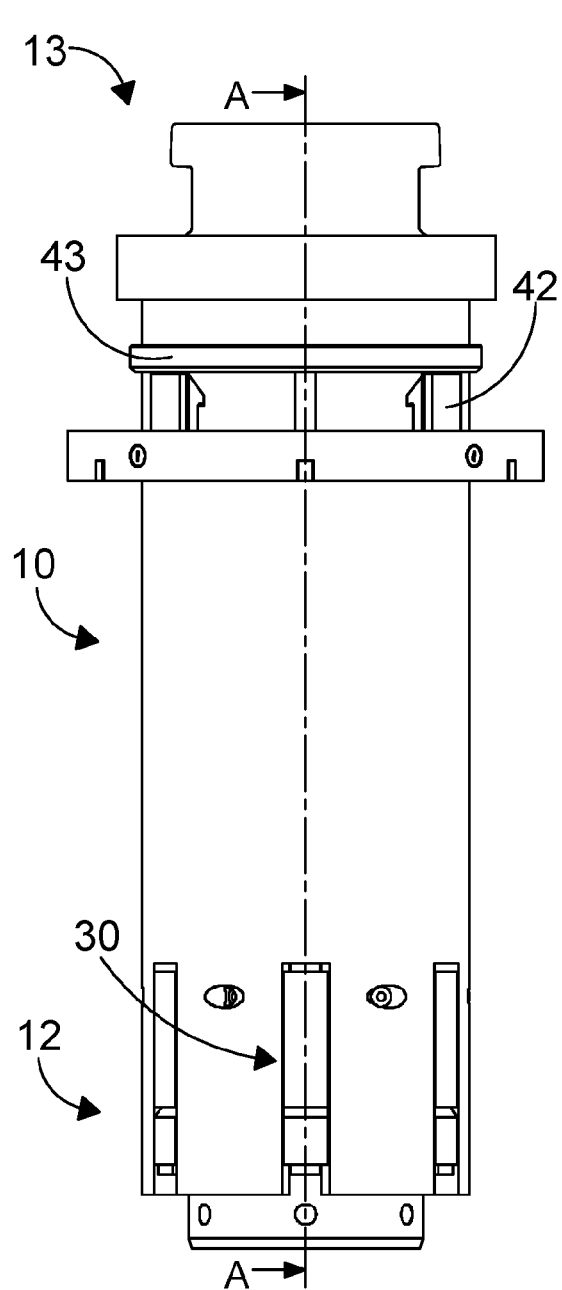
FIG. 1 shows a front view of an interface assembly in a release position.

Referring now to the drawings, a marine power conduit interface assembly 1 comprises a cable protection sleeve in one example. The assembly 1 has a housing with an axial bore 10b adapted to receive a cable C (see FIG. 14) used for power take off from an offshore wind turbine mounted on a base B anchored to the seabed. The turbine base B is typically tubular with an outer wall which has a socket S through which the cable C is pulled into a central bore of the base B during installation, usually from an adjacent turbine or transformer, or other subsea power management or generation apparatus. The cable C is large and heavy and relative movement of the cable C through the bare socket S during installation (and throughout the life of the cable C) would tend to wear the outer surface of the cable C, requiring replacement or maintenance at high costs. Hence, the assembly 1 provides a protection sleeve to protect the cable C and reduce the wear on it during use and installation.

During installation, the cable C is attached to a pull-in wire W for pulling the cable C through the socket S. The assembly 1 is attached to the pull-in wire by a weak link device L, such as is shown in US2019-0181623, the disclosure of which is incorporated herein by reference, which is designed to link the housing 10 to the pull-in wire W until the inner end 2 of the housing 10 enters the socket S, but then separate the connection between the housing 10 and the pull-in wire W so that the housing 10 remains in the socket S, while the cable C is pulled by the wire W into the central bore of the base B. Usually the cable C is pulled through the socket S and housing 10 for many metres until the inner end of the cable C is connected to power take off apparatus within the turbine. The socket S is usually close to the seabed, and the power take-off apparatus within the turbine is usually on an upper deck. Bend restrictors normally surround the cable C as it passes through the outer end 3 of the assembly 1.

The housing 10 in this example is generally cylindrical, and has a circumferential array of parallel grooves 15 extending partly (but not fully) through the wall of the housing in a radial direction, and extending axially along the inner surface of the bore 10b from an inner end 12, arranged to enter the socket S during installation, and stopping short of the opposite outer end 13, arranged to remain outside the socket S. The grooves 15 in this example have a rectilinear cross section (e.g. square or rectangular with straight and parallel side walls and a flat base. Close to the outer end 13, the housing has a circumferential array of outer slots 16 passing through the wall of the housing 10, and spaced at regular intervals around the axis. The slots 16 extend axially for a short distance, and are also mutually parallel (and parallel with the axis). The housing 10 also has a similar arrange of inner slots 17 (see FIG. 8) at its inner end 12, which again pass through the wall of the housing 10 and run out from the inner end 12.

Figure 2:
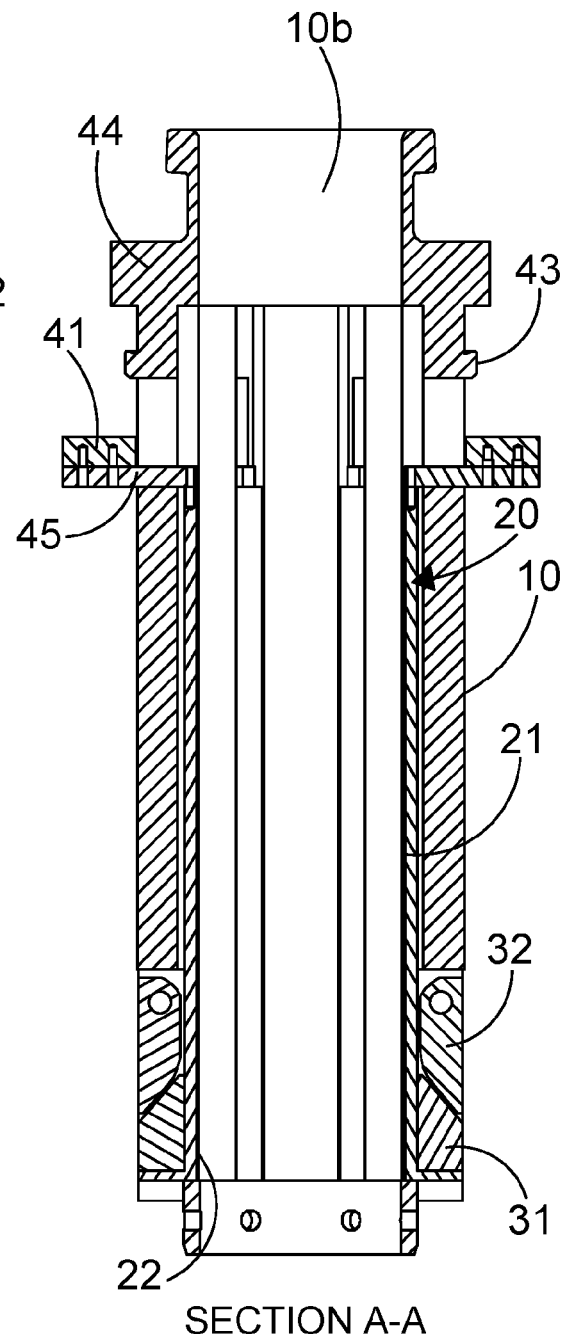
FIG. 2 shows a section through line A-A of FIG. 1.
Figures 3, 4:
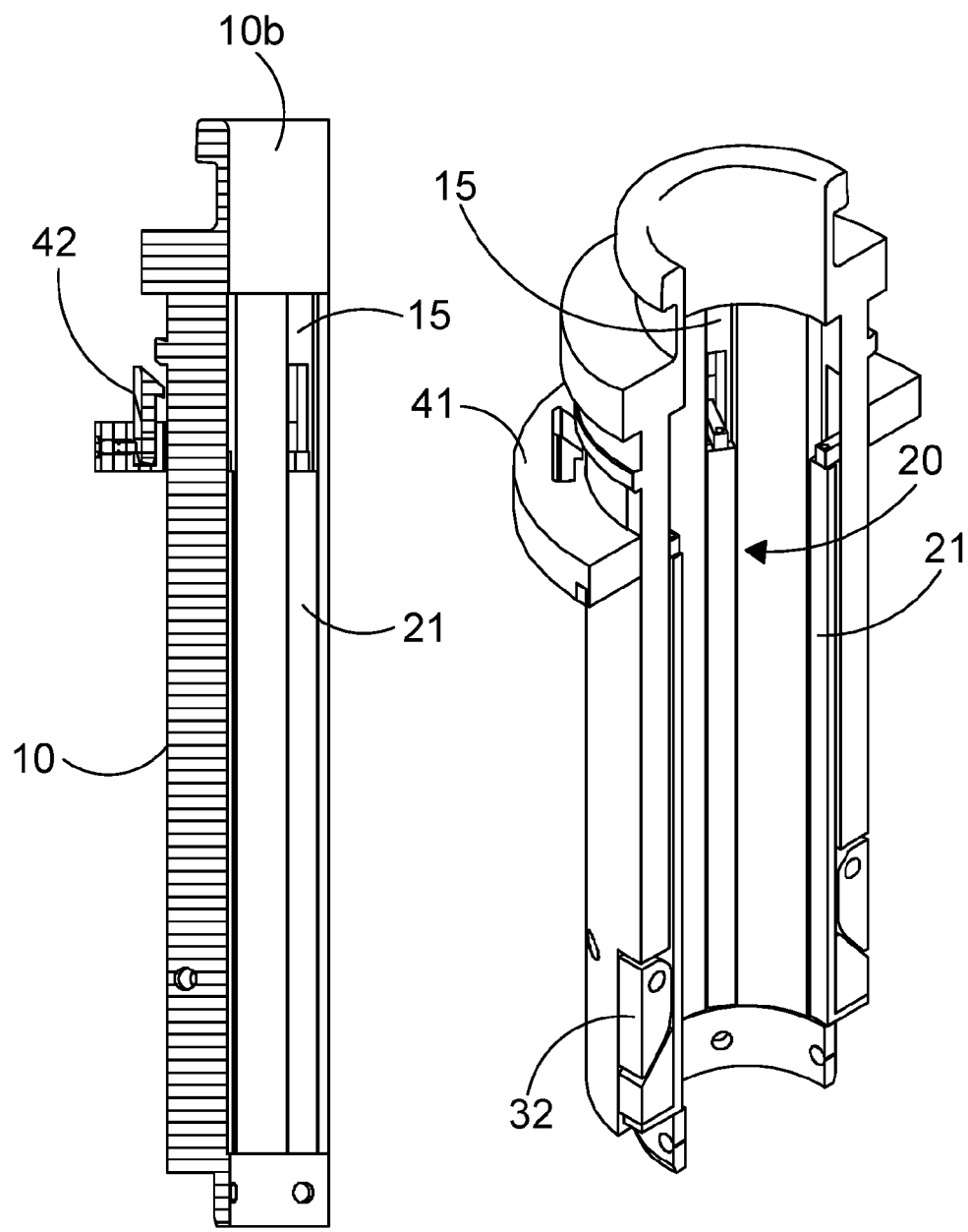
FIG. 3 shows a section through line B-B of FIG. 9 while in the FIG. 1 position.
FIG. 4 shows a cutaway view of the FIG. 1 arrangement.
Figure 10:
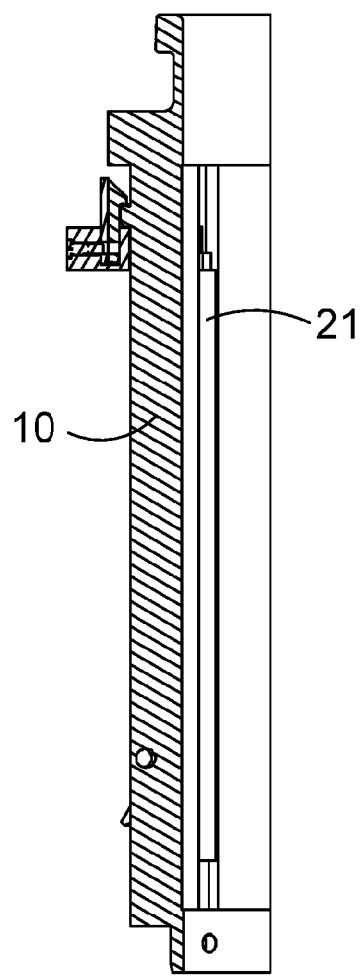
FIG. 10 shows a section similar to FIG. 3 while the assembly is in the FIG. 7 position)
Figure 11:
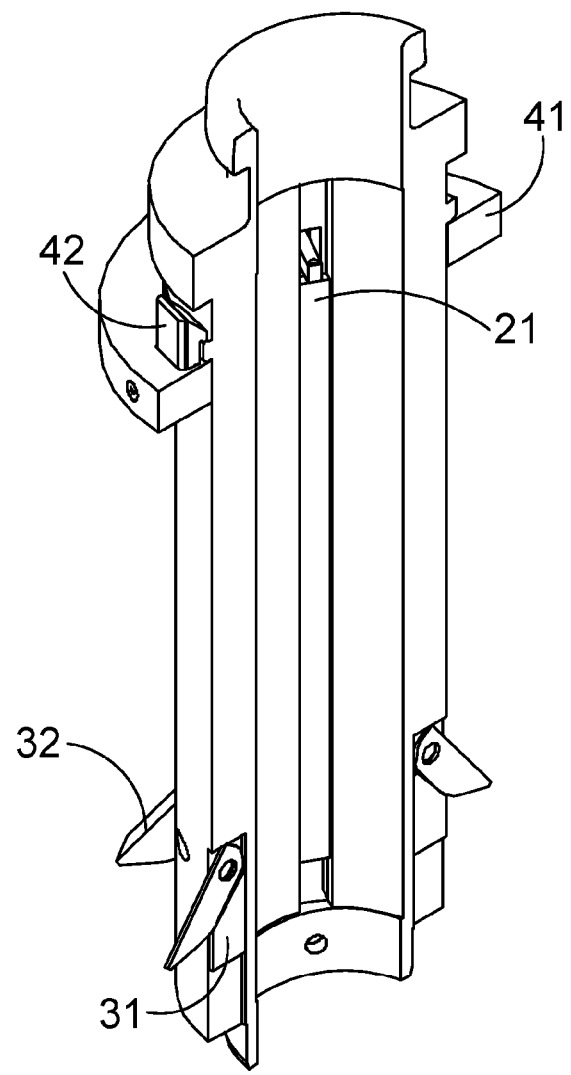
FIG. 11 shows a cutaway view of the FIG. 7 position.
Figure 12:
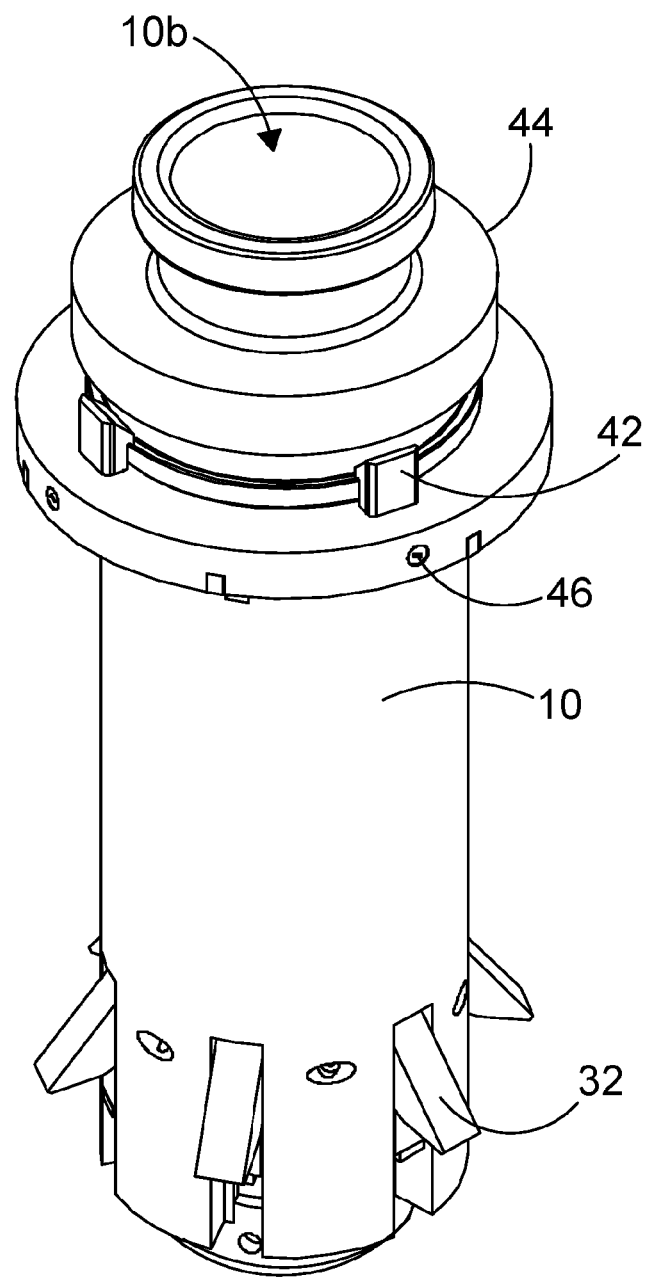
FIG. 12 shows a perspective view of the assembly in the FIG. 7 position.

The inner slots 17 receive locking arms 32 of a locking device 30, which are pivotally mounted in the slots 17 via a pivot pin at one end of the arms 32. The other end of each arm is free to pivot radially outwards from the housing 10, and has a radially inner surface with a tapered face (see FIG. 2).

Figure 13:
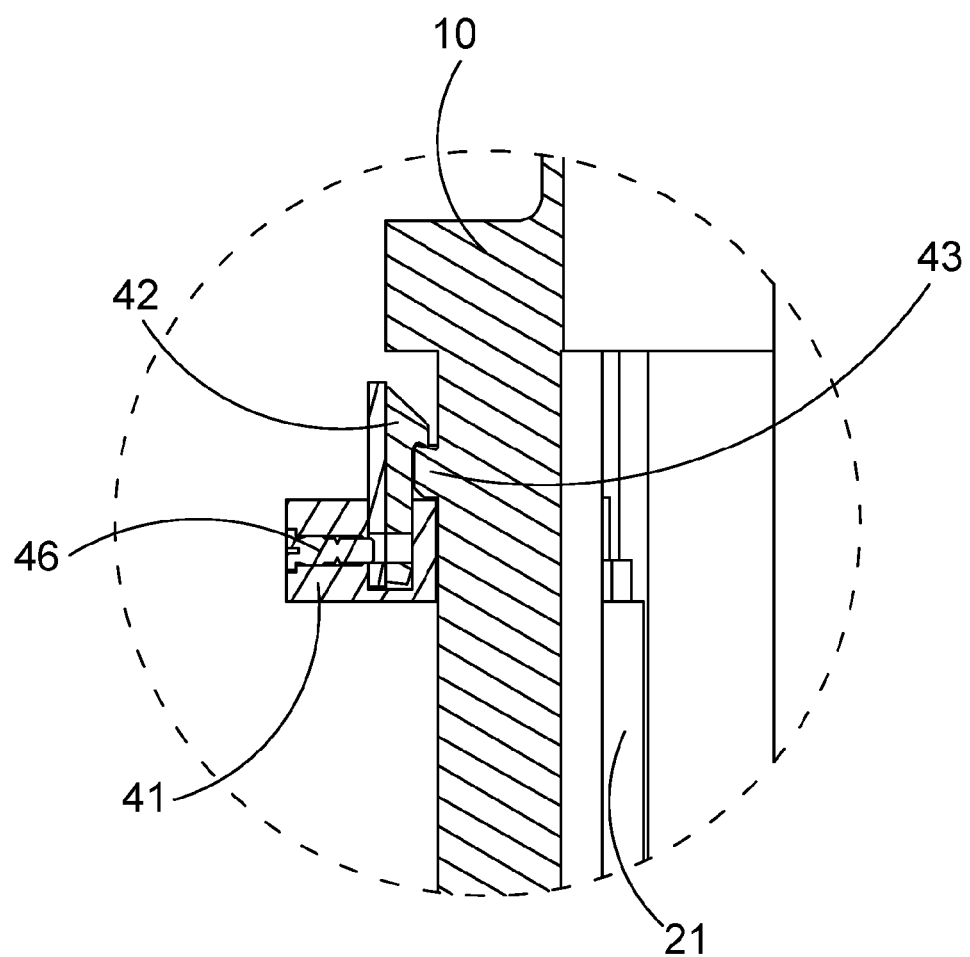
FIG. 13 shows a detailed view of a latch member in FIG. 10.

At the opposite outer end, between the outer end 13 and the outer slots 16, the housing has a flange 44 extending radially from the body of the housing, with flat faces, and a lip 43 between the flange 44 and the slots 16, optionally with a profiled outer face (closest to the outer end 13) that is optionally undercut (see FIG. 13). The inner end 13 also typically has a neck at its end termination to facilitate attachment of the housing 10 to the pull-in wire W or weak link device L.

Within the bore 10b of the housing 10, each of the grooves 15 houses a slide leg 21 collecting forming part of a slide 20, which is adapted to slide within the bore 10b (e.g. the same bore that the pull-in wire W and the cable C are run through) relative to the housing 10, between the inner and outer ends. The legs 21 and the grooves 15 have the same rectilinear cross section. The radial depth of the grooves 15 is larger than the radial dimensions of the legs 21 in order to increase the available size of the bore 10*b*. The legs 21 each have an L-shaped stop member extending radially at their inner ends, which abuts against and supports a lock operator which is in this example in the form of a ram block 31 of the locking device 30. The ram blocks 31 have tapered faces arranged facing the tapered faces of the locking arms 32, and having a matching taper (see FIG. 2). At the inner end 12 of the housing the legs 21 are not connected, but at the outer end 13 of the housing 10, the legs 21 are connected to a common latch ring 41 by latch fingers 45 that extend radially from the latch ring disposed on the outer surface of the housing 10 through the slots 16 at the outer end 13. In this example, the latch ring 41 is a sleeve fully covering the circumference of the housing 10. The latch fingers 45 are typically bolted to the outer ends of the slide legs 21, and to the latch ring 41 on the outer face of the housing 10. Thus the slide legs 21 and latch ring 41 move as a single unit in an axial direction, within the axial limits of the slot 16, so that as the latch ring 41 moves axially to the outer ends of the slots 16, the slide fingers 45 (and the ram blocks 31) slide in concert with respect to the housing 10 from the inner end 12 to the outer end 13.

The latch ring has latch members which are in this example in the form of hooks 42 (see FIG. 13), which are held on the latch ring 41 by shear pins 46, acting as grub screws that resist fallout of the hooks 42 from the latch ring 41, but which permit slight pivotal movement of the hooks in a radial plane with respect to the axis, within sockets of the latch ring 41, so that a tip of the hook 42, can engage and disengage from the lip 43. The hook 42 can, in this instance, be formed with an outer face of plastic material to permit resilient movement of the hook within the socket, even when constrained by the shear pin 46, and can optionally have a chamfered heel at its inner end (visible in FIG. 13) which limits the extent of pivotal movement of the hook within the radial plane. The shear pins 46 can optionally have a weak point allowing the pins 46 to shear when a threshold force is reached, which is useful during decommissioning. Optionally the shear pins 46 engage only a radially outer part of an aperture in the hook, so that the hook maintains freedom to move relative to the latch ring 41 in the radial plane, but does not become detached from the latch ring 41 during normal use while the pins 46 are intact.

Figure 14:
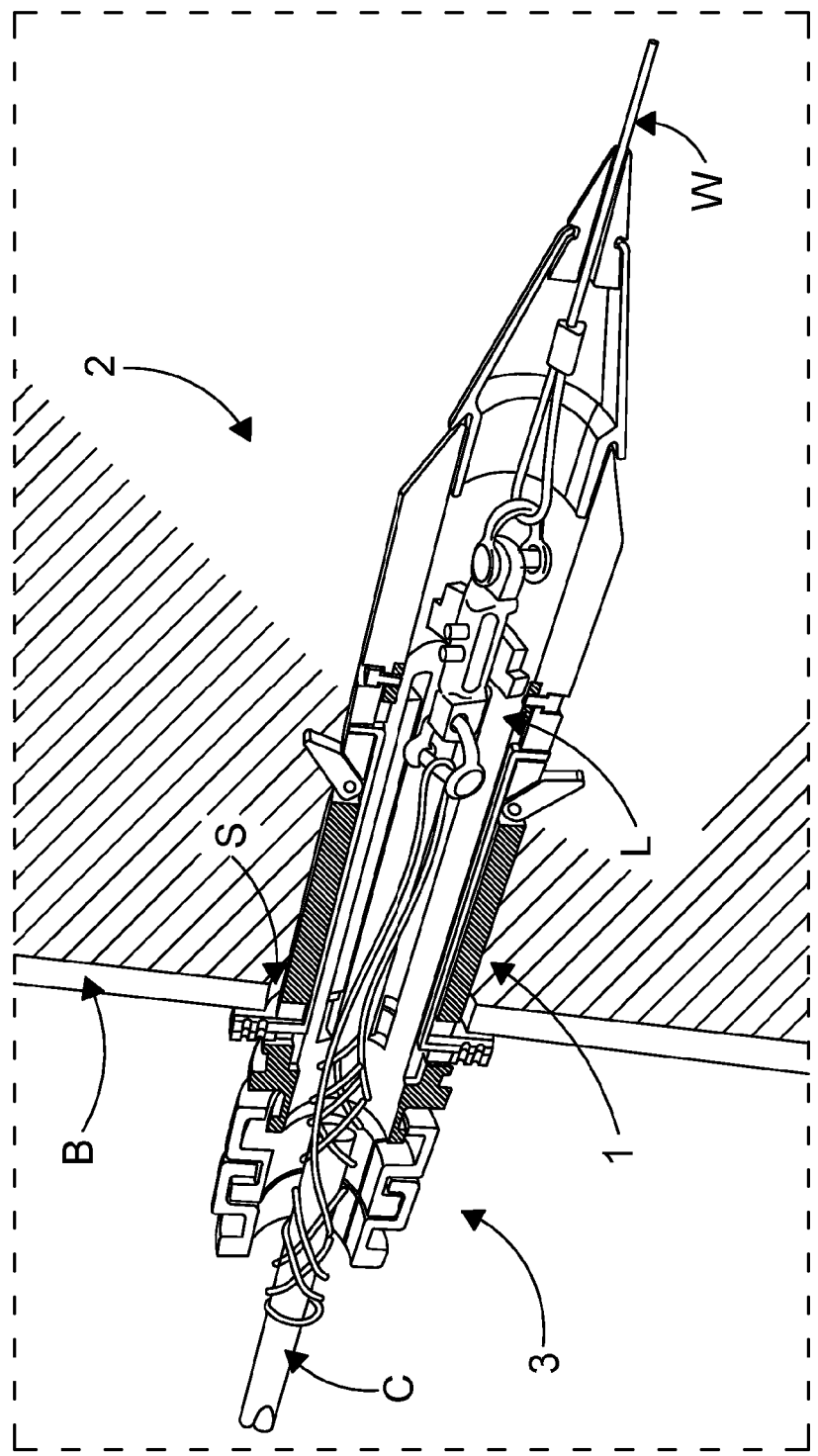
FIG. 14 shows a schematic cutaway view of an assembly in use with a cable.

In use, the assembly is connected to the cable C and pull in wire W as shown in FIG. 14, and the inner end is pulled through the socket S into the bore of the base B. During this stage, the assembly is in the configuration shown in FIGS. 1-5, with the locking arms 32 flush with the surface of the housing 10, and the latch ring 41 at the inner end of the slots 16, with the hooks 42 disengaged from the lip 43. The slide 20 is at the inner end 12 of the housing 10, and the ram blocks 31 are resting against the inner ends of the locking arms 32, but are not urging them from their flush configuration shown in FIGS. 1-5. The assembly has not reached the configuration shown in FIG. 14.

As the assembly 1 is pulled into the socket S, the latch ring 41 comes into contact with the outer surface of the base B. The radius of the latch ring 41 is larger than the radius of the socket S in order to prevent the latch ring 41 passing through the socket S. When this happens, the latch ring 41 stops moving with the wire W and the rest of the housing 10. Since the latch ring 41 is constrained against movement relative to the base B, as the housing 10 is drawn further into the socket S, the latch ring 41 therefore slides within the slots 16 towards the outer end 13 of the housing 10. Because the latch ring 41 is connected to the slide 20, the legs 21 likewise stop moving with the housing 10, and remain stationary as the housing 10 is drawn into the socket, causing the legs 21 to slide within the grooves 15 of the housing. This cases the ram blocks 31 to move axially relative to the locking arms 32 at the inner end 12 of the housing 10, and as the tapered faces of the ram blocks 31 and the locking arms 32 engage, the locking arms 32 are urged to move pivotally around pivot pins retaining their outer ends in the slots 17, causing the locking arms to expand radially from a first configuration shown in FIGS. 1-5 to a second radially expanded configuration shown in FIGS. 7-14. This happens after the inner end 2 of the assembly (and the inner end 12 of the housing 10) has fully entered the socket S and moved past the inner surface of the wall of the socket S, so that the radial expansion of the locking arms 32 only occurs when the locking arms 32 are inside the bore of the base B, and have cleared the socket S. The locking arms 32 expand radially to a dimension larger than the dimension of the socket S, so that the arms resist pull-out of the housing 10 from the socket S when the arms are in the second radially expanded configuration shown in FIGS. 7-14.

When the locking arms 32 are radially expanded into the second configuration, the latch 40 at the outer end 13 of the housing engages, moving the assembly in a latched position. This occurs when the latch ring 41 moves along the slots 16 until the hook 42 abuts against the inner edge of the lip 43, and then pivots to move beyond it, to the position shown in FIGS. 7-14. The shear pins 46 only hold the hooks 42 against fall-out, and permit movement of the hooks 42 to move over the lip, assisted by a tapered outer face of the hook 42 which rides up the inner edge of the lip 43. Once the hooks 42 have snapped back to the position shown in FIGS. 7-14 over the lip 43, the latch ring 41 is restrained against movement relative to the housing 10. This locks the ram blocks 31 in position relative to the locking arms 32, holding them in the radially expanded configuration shown in FIGS. 7-14, and thereby locking the assembly 1 within the socket S.

When the assembly is to be decommissioned, an operator can selectively disconnect the housing 10 from the socket S by forcing axial movement of the latch ring 41 away from the flange 44 on the housing 10, for example, by using a hydraulic jack or similar equipment. This shears the pins 46 holding the hooks 42 in position, and allows them to fall away from the latch ring 41 (optionally) or in some cases, the hooks 42 can be retained in the latch ring 41, but can release from the lip 43, thereby allowing sliding movement of the slide legs 21 along the axis to back the ram blocks 31 away from the locking arms 31, which can then pivot back to the flush position shown in FIGS. 1-6. This permits easy withdrawal of the housing 10 from the socket. The assembly can be re-dressed by replacing the pins 46 if desired.

Advantageously in certain examples, the locking arms 32 pivot from a flush position by less than 90°, so that the free ends of the locking arms 32 are oriented towards the inner end of the housing 10, and this helps the arms to passively retract to the flush position when they engage with the inner wall of the socket S during withdrawal of the housing 10.

The invention claimed is:
1. A marine power conduit interface assembly comprising a housing having an axis and a bore to receive a marine power conduit;
   at least one slide adapted to slide in an axial direction relative to the housing;
   a locking device adapted to secure the assembly within a socket of a marine energy generator, the locking device having at least one locking arm movable from a first radially retracted position to a second radially expanded position relative to the axis, and a lock operator adapted to move the locking arm from the first to the second position, wherein the lock operator and the locking arm engage by relative sliding movement along the axis to move the locking arm between the first and second radial positions;

wherein the locking arm is disposed on one of the housing and the slide and the lock operator is mounted on the other of the housing and the slide, and wherein relative sliding movement of the housing and slide in an axial direction causes relative movement of a first tapered face on the lock operator and a second tapered face on the locking arm to move the locking arm between the first and second radial positions;

wherein the assembly comprises a latch movable between a release position in which the slide is axially movable relative to the housing and a latched position in which relative sliding of the housing and the slide is restricted by the latch;

wherein the slide comprises at least one leg extending axially within the bore of the housing and an annular section in the form of a ring;

wherein the leg is disposed in a groove formed in the inner surface of the bore of the housing;

wherein the ring comprises a flange which extends radially outwards from the outer surface of the housing; and wherein the ring is connected to the at least one leg by a radially inwardly extending finger passing through a slot in the housing.

2. The marine power conduit interface assembly as claimed in claim 1, wherein the latch comprises a latch member on the slide and a latch plate on the housing and wherein the latch member is movable, relative to the housing, to engage and disengage with the plate.

3. The marine power conduit interface assembly as claimed in claim 1, having multiple legs each disposed in a respective groove, and wherein the legs and grooves are circumferentially spaced around the axis.

4. The marine power conduit interface assembly as claimed in claim 3, wherein the legs support the lock operator at cantilever ends disposed at an inner end of the housing.

5. The marine power conduit interface assembly as claimed in claim 1, wherein the lock operator is mounted on one end of the slide, and wherein the latch is mounted on the other end of the slide, spaced apart from the lock operator.

6. The marine power conduit interface assembly as claimed in claim 1, wherein the assembly has an inner end, adapted to pass through the socket in the marine energy generator, and an outer end, which in use remains external to the socket, and wherein the assembly comprises a stop member between the inner and outer ends, limiting passage of the housing into the socket, wherein the stop member is connected to the slide, and extends radially outward from the housing, and wherein insertion of the assembly into the socket activates the locking device when the outer surface of the socket engages a radially extending shoulder on the locking device which extends radially outward from the housing thereby resisting further inward movement of the slide into the socket and causing sliding movement of the slide relative to the housing.

7. The marine power conduit interface assembly as claimed in claim 1, wherein the locking arm is constrained to pivot by less than 90° relative to the housing.

8. The marine power conduit interface assembly as claimed in claim 7, wherein in the second radially expanded position the locking arm is disposed at an angle of less than 90° relative to the housing and wherein a free end of the locking arm is disposed between a pivot point of the locking arm and an inner end of the assembly adapted to be inserted into the socket.

9. The marine power conduit interface assembly as claimed in claim 8, wherein in the second radially expanded position the locking arm is disposed at an angle of less than 70° relative to the housing.

10. The marine power conduit interface assembly as claimed in claim 1, wherein the groove formed in the inner surface of the bore is open to the inner surface of the bore and has a radial depth which is less than the wall thickness of the housing.

11. The marine power conduit interface assembly as claimed in claim 1, wherein the radial depth of the groove is at least equal to the radial dimension of the leg.

12. The marine power conduit interface assembly as claimed in claim 1, wherein the groove has a rectilinear cross section with straight side walls, and with a flat base opposite an open side of the groove.

13. The marine power conduit interface assembly as claimed in claim 12, wherein the leg and the groove have the same shape of cross-section.

14. The marine power conduit interface assembly as claimed in claim 1, wherein the slot receiving the radially extending finger passes through inner and outer faces of the housing.

15. A marine power conduit interface assembly comprising a housing having an axis and a bore to receive a marine power conduit;

at least one slide adapted to slide in an axial direction relative to the housing;

a locking device adapted to secure the assembly within a socket of a marine energy generator, the locking device having at least one locking arm movable from a first radially retracted position to a second radially expanded position relative to the axis, and a lock operator adapted to move the locking arm from the first to the second position, wherein the lock operator and the locking arm engage by relative sliding movement along the axis to move the locking arm between the first and second radial positions;

wherein the locking arm is disposed on one of the housing and the slide and the lock operator is mounted on the other of the housing and the slide, and wherein relative sliding movement of the housing and slide in an axial direction causes relative movement of a first tapered face on the lock operator and a second tapered face on the locking arm to move the locking arm between the first and second radial positions;

wherein the assembly comprises a latch movable between a release position in which the slide is axially movable relative to the housing and a latched position in which relative sliding of the housing and the slide is restricted by the latch;

wherein the slide comprises at least one leg extending axially within the bore of the housing and an annular section in the form of a ring;

wherein the leg is disposed in a groove formed in the inner surface of the bore of the housing;

wherein the ring comprises a flange which extends radially outwards from the outer surface of the housing; and wherein the ring is connected to the at least one leg by a radially inwardly extending finger passing through a slot in the housing;

wherein the groove formed in the inner surface of the bore is open to the inner surface of the bore and has a radial depth which is less than the wall thickness of the housing, and wherein the radial depth of the groove is at least equal to the radial dimension of the leg; and wherein the radial depth of the groove is at least equal to the radial dimension of the leg.

16. A marine power conduit interface assembly comprising a housing having an axis and a bore to receive a marine power conduit;

at least one slide adapted to slide in an axial direction relative to the housing;

a locking device adapted to secure the assembly within a socket of a marine energy generator, the locking device having at least one locking arm movable from a first radially retracted position to a second radially expanded position relative to the axis, and a lock operator adapted to move the locking arm from the first to the second position, wherein the lock operator and the locking arm engage by relative sliding movement along the axis to move the locking arm between the first and second radial positions;

wherein the locking arm is disposed on one of the housing and the slide and the lock operator is mounted on the other of the housing and the slide, and wherein relative sliding movement of the housing and slide in an axial direction causes relative movement of a first tapered face on the lock operator and a second tapered face on the locking arm to move the locking arm between the first and second radial positions;

wherein the assembly comprises a latch movable between a release position in which the slide is axially movable relative to the housing and a latched position in which relative sliding of the housing and the slide is restricted by the latch;

wherein the slide comprises multiple legs extending axially within the bore of the housing and an annular section in the form of a ring;

wherein each leg is disposed in a respective groove formed in the inner surface of the bore of the housing and circumferentially spaced around the axis;

wherein the ring comprises a flange which extends radially outwards from the outer surface of the housing; and wherein the ring is connected to each of the legs by a respective radially inwardly extending finger passing through a respective slot passing through inner and outer faces of the housing;

wherein each groove formed in the inner surface of the bore is open to the inner surface of the bore and has a radial depth which is less than the wall thickness of the housing;

wherein the radial depth of each groove is at least equal to a radial dimension of the leg disposed within the groove; and wherein the groove has a rectilinear cross section with straight side walls, and with a flat base opposite an open side of the groove.

* * * * *